Figure 1:
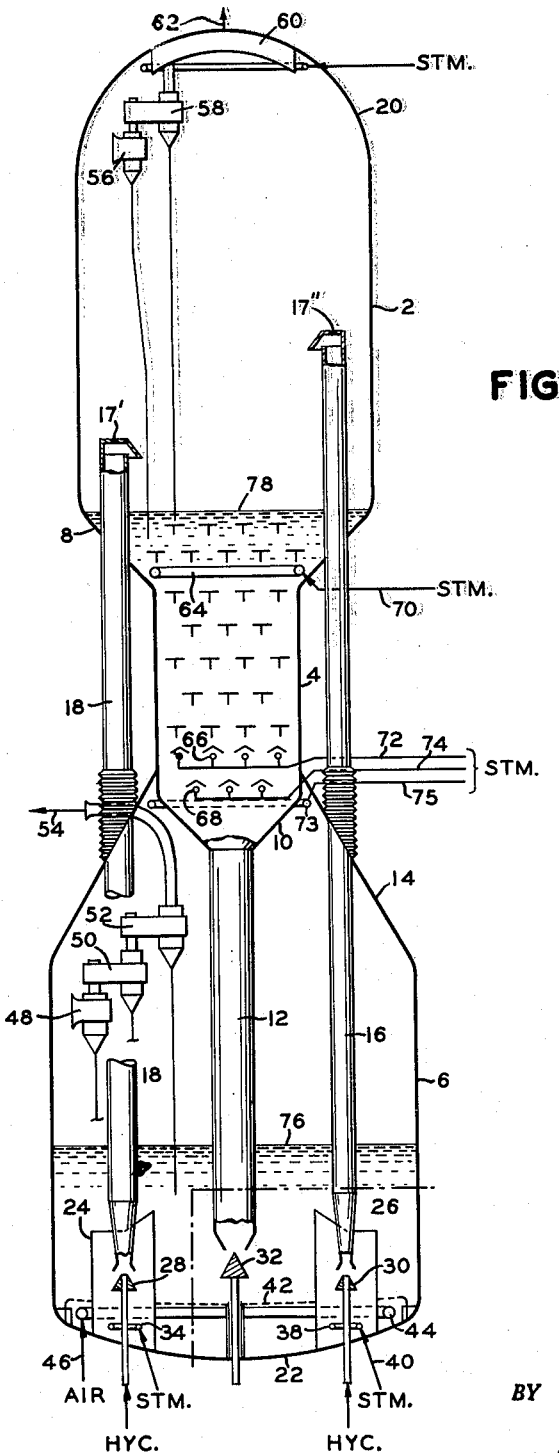

June 8, 1965

L. F. RICE ETAL 3,188,184

FLUID CATALYTIC CRACKING UNIT

Filed April 15, 1960

2 Sheets-Sheet 1

INVENTORS
LOUIS F. RICE
CHARLES E. SLYNGSTAD

BY
ATTORNEY
AGENT

INVENTORS
LOUIS F. RICE
CHARLES E. SLYNGSTAD

United States Patent Office 3,188,184
Patented June 8, 1965

3,188,184
FLUID CATALYTIC CRACKING UNIT
Louis F. Rice, Ridgewood, and Charles E. Slyngstad, Rutherford, N.J., assignors to Pullman Incorporated, a corporation of Delaware
Filed Apr. 15, 1960, Ser. No. 22,536
3 Claims. (Cl. 23—288)

This invention relates to an improved method and apparatus for cyclically circulating finely divided solid particle material in contact with gaseous and vaporizable materials. In one aspect the invention relates to the method of contacting finely divided solid catalytic material with one or more reactant materials and the recovery of products therefrom. In another aspect the invention is directed to the method and apparatus for recovering hydrocarbon products from finely divided catalytic material.

In fluid type catalytic hydrocarbon conversion systems a powdered or granular catalytic material is employed to effect conversion of hydrocarbon materials while the catalyst is suspended in partially or completely vaporized hydrocarbons undergoing conversion. Subsequently, the catalyst and reaction products are separated with the catalyst being recycled to a regeneration zone. In the regeneration zone the spent or contaminated catalyst is suspended in an oxygen-containing gaseous material to remove carbonaceous deposits on the catalyst by burning and thereafter the regenerated catalyst is returned to the hydrocarbon conversion step. Many variations of the above cyclic process have been proposed each with its own benefits and deficiencies; however, these systems have not been completely satisfactory since they require very complex apparatus, do not employ the catalyst in the system as efficiently as desired, require relatively large catalyst inventory and in some respects do not accomplish the desired degree of conversion or satisfactory recovery of converted products.

An object of this invention is to provide an improved method and means for contacting finely divided catalytic material with hydrocarbon reactant material and the recovery of products of conversion thereof.

Another object of this invention is to provide an integrated and unitary apparatus for practicing the improved method of this invention.

A further object of this invention is to provide a method of operation which will substantially reduce the catalyst inventory required in the system.

Other objects and advantages of the present invention will become apparent from the following description.

In one embodiment this invention is directed to an improved arrangement of apparatus comprising a unitary vessel having an upper enlarged separating chamber, an intermediate stripping chamber, and a lower regenerating chamber with at least one riser-reactor extending from the regenerator chamber upwardly into the separator chamber and at least one standpipe extending downwardly from the lower portion of the stripping chamber to the lower portion of the regeneration chamber.

In another embodiment the present invention is directed to the method and apparatus wherein similar or dissimilar hydrocarbon reactant materials such as gas oils, topped crudes, residual oils, cycle oils and other relatively high-boiling hydrocarbon fractions may be converted with finely divided catalytic material as a suspension in a plurality of independent suspensoid reaction zones which discharge into a common enlarged separation zone with the independent suspensoid reaction zones being supplied with hot freshly regenerated catalytic material from a common regeneration zone.

Providing the modern refiner with a single unitary apparatus which will permit him to effect conversion of a particular feed or a variety of different hydrocarbon feed materials simultaneously as desired is of great importance, particularly in view of the many hydrocarbon feed materials available to the refiner today and the desire to obtain maximum throughput of hydrocarbon feed material to obtain maximum yields of desired products. Hydrocarbon feed materials such as those hereinbefore mentioned and employed in catalytic conversion processes contain constituents, depending upon the source of the feed material, which are difficult to vaporize at the temperature and pressure conditions employed during conversion thereof and therefore require somewhat different operating conditions to obtain the desired degree of conversion, all of which contribute to operating difficulties for the refiner. The non-vaporous or liquid-like constituents present in the hydrocarbon feed materials contribute to the formation of relatively large catalyst agglomerants which tend to defluidize in dense fluid bed type of operations, thereby upsetting the fluid operation and requiring expensive shut downs unless suitable precautions are taken to avoid such conditions occurring. In addition, when employing relatively large conversion apparatus considerable difficulty has been experienced in uniformly distributing high boiling hydrocarbon reactant material on the catalyst in a realtively dense fluid bed of catalytic material, thereby emphasizing the difficulties with respect to controlling the severity of conversion and controlling the time of contact of the various hydrocarbon feed materials with the catalytic material to obtain the desired degree of conversion.

The improved method and apparatus of this invention is directed in one aspect to treating relatively high-boiling hydrocarbon reactant materials either in a vaporized or partially vaporized condition and at least in an atomized condition with finely divided catalytic material as a suspension wherein a gasiform diluent material is employed in conjunction with the hydrocarbon feed to improve distribution of the hydrocarbon on the catalytic material by atomizing the hydrocarbon into relatively fine droplets. The diluent material also effects a reduction in the hydrocarbon partial pressure within a desired range. The hydrocarbon reactant and gasiform diluent material are mixed with hot freshly regenerated finely divided catalytic material in a catalyst to oil ratio in the range of from about 5 to about 25 to 1. Thereafter the mixture is passed as a suspension having a catalyst density in the range of from about 1 to about 10 lbs. per cubic foot, through suitably elongated suspensoid hydrocarbon reaction zones which terminate in an enlarged separation zone.

In accordance with one embodiment of this invention it is contemplated employing a plurality of elongated confined reaction zones employing a relatively dilute phase suspension of catalyst, as opposed to a dense phase of catalyst, wherein similar or dissimilar hydrocarbon feed materials may be separately converted under elevated temperature conversion conditions with the suspension of each reaction zone being discharged into a common enlarged separation or disengaging zone. In the apparatus of this invention the enlarged separation zone may be considered as performing the function of a first large cyclone separation zone without the disadvantages associated with employing large cyclone separators. That is, cyclone separators are subjected to considerable erosion, when employed to separate finely divided catalytic material from a high velocity stream and particularly when passing relatively large volumes of finely divided solid material directly into the cyclone separators. Under these conditions, the cyclone separators become easily overloaded, thereby destroying their separating efficiency. A further disadvantage and probably one of the most important disadvantages associated with such an arrangement would be directed to the size of the cyclone separators required, the expense of fabricating such large cyclone separators, the mechanical problems associated with supporting a plurality of large cyclone separators and providing for recovery of hydrocarbon products as well as the recovery of separated finely divided catalytic material from the plurality of large cyclone separators. Accordingly, the disadvantages associated with relatively large cyclone separators in the system contemplated by applicants is substantially overcome by providing an enlarged separation or disengaging zone more fully discussed herein.

In the separation or disengaging zone of the method and apparatus described herein, separation of the relatively high velocity suspensoin of finely divided catalytic material and hydrocarbon material discharged from the riser-reactor zones is facilitated by abruptly changing the vertical velocity component of the suspension, and by substantially reducing the hydrocarbon partial pressure. In addition, sufficient disengaging space is provided above the riser outlet to separate the major portion of finely divided catalytic material from hydrocarbon material by settling before passing the hydrocarbon products to suitable cyclone separators in the upper part of the disengaging zone.

The improved apparatus of this invention contemplates employing a plurality of elongated relatively large diameter riser-reaction tubes or conduits which extend from the lower portion of the regeneration chamber upwardly into the disengaging or separation chamber. In one embodiment at least one riser-reactor terminates in the upper intermediate portion of the separation chamber with another riser-reactor terminating in the lower portion of the separation chamber. There may be at least two riser-reactor chambers terminating in each of the intermediate and lower portion of the separation chamber. In another embodiment it is contemplated terminating all of the riser-reactors in the intermediate or lower portion of the separation chamber and sufficiently below the top thereof to provide the desired amount of disengaging space, preferably not less than about 12 feet in height above the riser outlets. Although the riser-reactors may be substantially the same size in diameter it is contemplated employing at least one riser-reactor of a larger diameter than the remaining riser-reactors. Generally, the riser-reactor terminating in the lower portion of the separation zone will be of a larger diameter than the riser-reactors terminating in the intermediate portion of the separation zone.

To effect an abrupt change in the vertical velocity component of the suspension passing upwardly through the riser, the open discharge end of the riser is provided with a deflector baffle means spaced thereabove and provided with suitable flange means to direct the suspension of catalyst and hydrocarbon downwardly upon discharge from the riser. While a number of suitable deflector baffle means may be provided to accomplish the above, it is proposed to employ in the apparatus herein a deflector baffle sufficiently spaced above the riser open end or discharge to provide an annular passageway having an area at least equal to and preferably greater than the cross-sectional area of the riser. A suitable deflector baffle arrangement may be formed by a flat circular plate of larger diameter than the riser and provided with downwardly extending flange means. In any suitable deflector baffle design it is also contemplated gradually enlarging the riser near its discharge end with a suitable cone shaped baffle member, which arrangement will be effective in reducing the velocity of the suspension near the riser discharge and prior to contact with the deflector baffle. That is, it is desirable to reduce the velocity of the upflowing suspension prior to its contact with the deflector baffle to a velocity of at least about 50 feet per second and preferably about 30 feet per second.

As hereinbefore discussed, the suspension of catalytic material and hydrocarbon products discharge from the plurality of riser-reactors, are separated with the finely divided catalytic material settling out to form a shower of falling catalyst in a relatively dispersed phase condition to the bottom portion of the separating zone onto a relatively dense fluid bed of catalytic material having an upper level or meniscus lying beneath the discharge of the lowermost riser-reactor. In this arrangement of riser-reactors, the hydrocarbon material discharge from the risers terminating in the lower portion of the separation zone pass in countercurrent contact with the falling shower of dispersed phase catalytic material discharged from the riser-reactors terminating in an upper portion of the separation zone. The hydrocarbon products recovered from the catalyst are withdrawn from the upper portion of the separation zone and passed to suitable product recovery equipment, not shown.

One of the important aspects of the improved method and apparatus of this invention relates to the method of handling the realtively dense fluid bed of catalytic material recovered in the bottom portion of the separation zone and extending downwardly as a continuous dense fluid bed from the bottom thereof into an elongated cylindrical stripping zone in open communication in the upper portion thereof with the separation zone. This arrangement is of particular advantage in the method and apparatus contemplated by this invention since it provides the necessary extended time to strip off difficultly vaporizable hydrocarbon material adsorbed on the catalyst material. Furthermore, all of the stripping gas discharged from the stripping zone is available to assist in separating hydrocarbon material from the dispersed phase catalytic material discharged from the riser-reactors. In the elongated stripping zone positioned beneath an extending downwardly from the separation zone, the finely divided catalytic material is countercurrently contacted with a stripping gas introduced at one or more vertically spaced apart sections under conditions to remove additional vaporizable hydrocarbons from the catalytic material. Thereafter the stripped catalytic material is passed by an elongated confined standpipe from the bottom of the stripping chamber to the lower portion of the regeneration chamber. Stripping of the catalytic material in the stripping zone may be effected under a wide variety of temperature conditions which may be above, below or at substantially the temperature of the catalytic material discharged from the riser-reactor zones.

One of the problems associated with any stripper design is directed to obtaining suitable and efficient contact of catalytic material with stripping gas and this problem becomes aggravated in relatively large stripping chambers contemplated by this invention. That is, in any apparatus employing relatively large stripping chambers having a diameter greater than about 8 feet in diameter, for example 10 or 20 feet in diameter, the mechanical problems associated with providing suitable baffle means within the stripping chamber to assure intimate contact of catalyst with stripping gas becomes particularly aggravated because of the weight and movement of the catalyst in the chamber. Furthermore, it is essential to minimize the restricted cross-sectional area due to the baffles in any one horizontal plane of the stripper to assure desired downward flow of catalytic material through the chamber without unnecessary enlarging the stripping chamber while at the same time providing a plurality of restricted and non-restricted stripping sections within the stripping compartment to provide for tortuous countercurrent contact of catalytic material and stripping gas.

To accomplish the above in the large stripping chamber herein contemplated, the stripping chamber is provided with a plurality of transverse baffle members to provide a plurality of alternating restricted and nonrestricted cross sections through which the downwardly flowing catalyst must pass. While any numebr of restricted and nonrestricted sections may be employed, it is desirable to use as many as possible, preferably at least about 7 to cause several changes in direction of flow of the catalyst, as well as to provide a plurality of relatively high and low velocity stripping sections within the stripping chamber. In a first consideration it is essential to provide a transverse baffle design which is economical and sufficiently rigid to horizontally traverse the stripper chamber and at the same time assure the desired distribution and countercurrent contact of the catalyst and stripping gas. In this respect it was found that a T shaped baffle member could be best employed in one part of the stripper with an inverted V shaped baffle member being best employed in another part of the stripper. That is, the inverted V shaped baffle member, although structurally less rigid than the T shaped baffle member, tends to collect gas thereunder which the T baffle is less likely to do. These characteristics of the T and inverted V baffles were employed to applicants' advantage by employing inverted V transverse baffles at the stripping gas inlets where relatively large volumes of stripping gas are introduced and T shaped transverse baffles in the sections above the stripping gas inlets. Accordingly, applicants have provided the stripper chamber with a plurality of horizontally spaced apart transverse T shaped baffle members on a plurality of horizontally and vertically spaced apart planes throughout substantially the vertical height of the stripping chamber with the transverse T shaped baffle member in any one plane being vertically staggered from the T shaped baffle member on the plane next above. A disadvantage in the use of the inverted V transverse baffle in the stripper other than at the stripping gas inlet resides in the tendency of the inverted V baffle to collect gas thereunder and bypass the stripping gas to the side or wall of the vessel in the event that the inverted V baffle is not in a substantially horizontal position. Furthermore, relatively small changes in the density of the downwardly flowing mass of catalyst would also encourage this condition. Such a condition would, therefore, lead to channeling the stripping gas through the stripping chamber, thereby substantially reducing the stripping efficiency of the chamber and would permit insufficiently stripped catalyst to be passed to the regenerator. However, by employing suitable precautions when installing the inverted V baffle at the stripping gas inlet where relatively large volumes of stripping gas is introduced the characteristic of the inverted V baffle to collect and distribute gas througout the length thereof is employed to advantage.

One of the important aspects of the improved stripper of this invention relates to introducing stripping gas thereto. That is, the stripping gas is introduced to the stripping zone at a plurality of vertically spaced apart, cross-sectional areas with the uppermost area being substantially at the juncture of the conical bottom of the separation chamber with the vertical wall of the stripper chamber with the stripping gas being introduced in this area by a perforated annular distributor ring so positioned. The lowermost point for introducing stripping gas to the stripping zone is determined by the velocity of the downwardly flowing catalytic material within the stripper and is located above the horizontal area in which the catalyst reaches a downward velocity greater than about 2.4 feet per second. By so positioning the lowermost stripping gas inlet to the stripping zone substantially all of the stripping gas will pass upwardly through the stripping zone rather than being carried downwardly with the catalytic material passing into the standpipe. The stripped catalytic material is then squeezed below the lowermost stripping gas inlet in a funnel shaped section extending downwardly from the bottom of the stripping chamber wherein additional gaseous material is removed. Thereafter the catalyst is passed downwardly through an elongated substantially vertical standpipe to the lower portion of a regeneration chamber with the flow of catalytic material discharged from the standpipe being controlled by a vertically movable plug valve aligned with the bottom open end of the standpipe.

In the regenerator a relatively dense fluid bed of catalytic material is maintained by passing air or a suitable oxygen-containing gas introduced to the lower cross-sectional area thereof upwardly through the catalytic material. The catalytic material is regenerated by removing carbonaceous deposits therefrom by burning with the oxygen-containing gas, thereby heating the catalyst to an elevated temperature suitable for recycle to the inlet of the riser-reactors. Each riser-reactor is surrounded in the lower portion thereof by a cylindrical baffle member open at its upper end which extends from the dish shaped bottom of the regenerator substantially vertically upward a substantial distance into the dense fluid bed of catalytic material in the regenerator and terminates at least above the standpipe discharge. In another embodiment it is contemplated surrounding the lower portion of the standpipe with a cylindrical well open at its upper end whereby the catalytic material discharged from the standpipe is caused to change its direction of flow and flow upwardly around the standpipe as an annular stream into the relatively dense fluid bed of catalytic material in the regenerator. In this latter embodiment a first portion of the regeneration gas or a relatively inert gas may be passed with the annular catalyst stream flowing upwardly around the standpipe with the remaining portion of the regeneration gas required to regenerate the catalyst being supplied to the lower cross-sectional area of the relatively dense fluid bed of catalytic material in the regenerator. When employing this latter arrangement with a cylindrical well around the lower end of the standpipe it is not essential to provide a cylindrical well around the riser inlets.

The regenerator chamber is provided in the lower portion thereof with suitable regeneration gas inlet means which may be independent gas flow controlled circular or semicircular distributor manifolds or other suitable manifold arrangements to distribute regeneration gas across the lower cross section of the regenerator and these manifold arrangements may be employed either with or without a gas distributor grid positioned above the manifolds.

In a preferred embodiment the regenerator chamber is provided with a dish-shaped bottom of minimum depth having a perforated baffle member positioned and spaced above the dish-shaped bottom to provide a regeneration gas distribution chamber. The perforated baffle member or distributor grid is formed to provide a downwardly extending non-perforated flange member which is rigidly attached at its lower extremity to the dish-shaped bottom of the regenerator chamber. By this improved arrangement the perforated grid member is substantially constantly in tension while permitting the grid to expand and contract due to changes in temperature experienced in the regenerator. In addition, by so installing the perforated grid member it has been possible to retain the grid during operation in its desired position within the lower portion of the regenerator areas. In prior apparatus designs wherein the grid was fastened to the vertical wall of the regenerator it was virtually impossible to prevent the grid from being torn from its rigid mounting points. The perforated grid employed is provided with suitable slip joint arrangements in the areas where the cylindrical wells surrounding the risers or standpipe pass through the grid. In the specific embodiment shown and described herein, the vertically movable plug valve aligned with the standpipe is shielded by a cylindrical baffle member extending upwardly from the dish shaped bottom through the perforated grid to form an annulus surrounding the valve through which suitable bleed gas such as steam is passed. Positioned within the distributor chamber formed by the perforated baffle member and the dish shaped bottom of the regenerator chamber is provided an annular gas distributor ring which describes a circle lying outside the cylindrical wells surrounding the lower portion of the risers. The annular distributor ring is perforated in its lower inside quadrant lying between the vertical and horizontal axis of the annular ring to direct regeneration gas into the distributor chamber. By this arrangement, regeneration gas is substantially uniformly distributed throughout the cross-sectional area of the fluid bed of catalytic material above the grid. The distribution of regeneration gas substantially uniformly across the fluid bed of catalyst is, of course, extremely important to obtain proper regeneration of the catalyst and obtaining such uniform distribution becomes increasingly difficult as the size of the regenerators becomes bigger and bigger and several hundred tons of catalyst inventory are maintained in the regenerator chamber.

The catalyst employed in the method of this invention may be any of the well known cracking catalysts of the prior art which are generally silica base catalysts such as silica-aluminua, silica-magnesia, with or without additional promoters such as chromium, zirconium, boria, etc. The catalyst is employed in finely divided powdered form including a particle size in the range of from about 0 to about 200 microns in diameter, more usually from about 20 to about 150 microns in diameter.

The hydrocarbon conversion conditions employed in the method of this invention include temperature conditions in the range of from about 850° F. to about 1100° F., preferably from about 900 to about 1000° F., and the pressures in the range of from about atmospheric to about 100 p.s.i.g., preferably from about 5 to about 50 p.s.i.g.

That is, it is contemplated employing the riser-reactors under different temperature conversion conditions such that the shower of catalytic material in dispersed phase in the separation zone may be at a temperature above, below or substantially equal to the temperature of a riser suspension discharged into the lower portion of the separation zone. For example, it is contemplated discharging a suspension of catalytic material and hydrocarbon material from at least one riser-reactor in the upper portion of the separation zone at a temperature of at least about 1000° F. and from at least one riser-reactor into the lower portion of the separation zone at a temperature of at least about 900° F., or the reverse temperature conditions may be employed. In another arrangement the risers may discharge at substantially the same elevation with the risers' discharge temperature being substantially the same or one may be higher than the other. In any of these arrangements the temperature employed in the riser will be controlled substantially by the quantity of catalyst introduced to the riser with the maximum quantity of catalyst added limited to maintain an upwardly flowing suspension as opposed to a dense phase condition experiencing substantial backflow of catalytic material. In this arrangement the regenerator temperature operation conditions will be sufficiently high to supply the major portion and substantially all of the endothermic heat of conversion and will include temperatures in the range of from about 1150° F. to about 1400° F., and pressures in the range of from about 5 to about 50 p.s.i.g. The method and system of this invention is adapted to be run in heat balance conditions with the major portion of the heat liberated during regeneration being employed to supply the endothermic heat requirements of the cracking steps, however, the conversion heat requirements may be supplemented by preheating the feed as desired in suitable feed preheat furnaces. The catalyst to oil ratio employed may vary in the range of from about 5 to about 25 to 1, depending upon the catalyst density employed in the riser-reactors to convert a given feed material therein. Generally the catalyst density employed in the riser-reactors will be in the range of from about 1 to about 10 lbs. per cubic foot. As hereinbefore indicated the improved system of this invention effects a substantial reduction in the catalyst inventory required to convert the hydrocarbon feed material passed thereto. Since catalyst losses from the system are a direct function of the catalyst inventory in the system, any reduction in catalyst inventory becomes of significant importance to the refiner, particularly in systems of the size herein contemplated. For example, in the system herein described a relatively dense fluid bed of catalytic material is maintained only in the regeneration zone and the stripping zone. Since a reaction zone containing a relatively dense fluid bed of catalytic material is not employed and eliminated in the system of this invention, this amounts to a substantial catalyst inventory reduction of about 30 percent. In large systems of the type herein described circulating catalytic material at a rate of about 10 million pounds per hour (5000 tons per hour), the savings in catalyst inventory due to the elimination of a dense fluidized bed hydrocarbon conversion zone becomes significant and of economical importance.

Having thus generally described the improved method and apparatus of this invention, as well as preferred embodiments thereof, reference is now had to the drawings, by way of example, which illustrate preferred embodiments thereof.

Referring now to FIGURE 1, a unitary vessel is shown having an upper cylindrical separation chamber 2, an intermediate cylindrical stripping chamber 4 and a lower cylindrical regeneration chamber 6. The bottom of separator chamber 2 is formed by a conical frustum baffle member 8 which is attached at its lower periphery to the upper end of the cylindrical wall forming chamber 4. The bottom of stripping chamber 4 is formed by a second conical frustum baffle member 10 which is attached at its upper periphery to the cylindrical wall of the chamber and at its lower periphery to the top of standpipe 12. The top of the regenerator chamber 6 is formed by an inverted conical frustum which is attached to the cylindrical wall of the regenerator chamber and at its upper periphery to the lower portion of the cylindrical wall of stripper 4 and above the juncture of baffle 10 with the cylindrical wall of stripper 4. A first riser conduit 16 extends from the lower portion of regenerator 6 substantially vertically upwardly through baffles 14 and 8 into the intermediate portion of separator chamber 2. A second riser conduit 18 is shown extending from the lower portion of regenerator chamber 6 substantially vertically upwardly through baffles 14 and 8 into the lower portion of separator chamber 2 with riser conduit 18 terminating above the juncture of baffle 8 with the cylindrical wall of separator chamber 2. The top of separator chamber 2 is formed by a dome shaped baffle member 20 and the bottom of regenerator chamber 6 is formed by a dish shaped baffle member 22. A cylindrical baffle member 24 extends substantially vertically upwardly from baffle member 22 into said regenerator chamber to form a well having an annular space or passageway about the lower portion of riser 18. A similar cylindrical baffle 26 extends substantially vertically upwardly from baffle 22 to form a well with an annular space or passageway about the lower portion of riser 16. Vertically movable hollow stem plug valves 28 and 30 are aligned with the bottom open end of riser conduits 18 and 16 respectively with a vertically movable solid plug valve 32 aligned with the bottom open end of standpipe 12. A steam distributor ring 34 supplied by conduit 36 is positioned in the lower portion of the well formed by cylindrical baffle 24 similarly to steam distributor ring 38 supplied by conduit 40 positioned in the lower portion of the well formed by cylindrical baffle 26. Positioned across the lower cross section of the regenerator chamber is provided a perforated baffle member 42 more fully discussed with respect to FIGURE 2 hereinafter. A regeneration gas distributor manifold 44 supplied by conduit 46 is positioned beneath grid 42 describing a circle lying outside of the cylindrical wells formed by baffles 24 and 26. The regenerator chamber is provided in the upper portion with sequentially connected cyclone separators designated 48, 50 and 52 which are provided with suitable diplegs extending into a fluid bed of catalytic material maintained in the lower portion of the regenerator. Regeneration flue gases separated from catalytic material in the cyclone separators are eventually removed from the regenerator chamber by conduit 40 connected to cyclone separator 52. The separator chamber 2 is also provided in the upper portion thereof with cyclone separators 56 and 58 having suitable diplegs connected thereto which extend downwardly into substantially the top of the stripping chamber. Cyclone separator 58 is connected to a plenum chamber 60 through which hydrocarbon products are passed for removal from the vessel by conduit 62. Stripping chamber 4 is provided with a plurality of vertically spaced apart stripping gas inlet means 64, 66 and 68 supplied by conduits 70, 72 and 74, respectively, with the uppermost stripping gas inlet means being shown as an annular manifold 64 positioned adjacent and preferably above the juncture of the vertical wall of the stripping chamber 4 and baffle member 8. The lowermost stripping gas inlet means comprises a plurality of alternately staggered inverted V shaped baffle members which horizontally traverse the cylindrical stripping chamber and are positioned on a plane lying above the juncture above the conical bottom and vertical wall of the stripping chamber 4. As more fully discussed herein, a plurality of alternately staggered T shaped baffle members are positioned within and horizontally traverse the cylindrical stripping chamber to provide for tortuous flow of catalytic material downwardly through the stripping chamber countercurrent to stripping gas. In the apparatus of FIGURE 1 a relatively dense fluid bed of catalytic material having an upper meniscus or level 76 is maintained in the regeneration chamber wherein the catalytic material is heated by burning of carbonaceous material with an oxygen-containing gas, thereby heating the catalyst to an elevated temperature. A portion of the thus heated catalyst is withdrawn into the well defined by baffle 24 and enters the bottom open end of riser 18 wherein it is mixed with a first hydrocarbon reactant material introduced by hollow stem valve 28 to form a suspension of hydrocarbon reactant and catalytic material which is passed upwardly through the riser. The relatively dilute suspension of hydrocarbon reactant and catalytic material passes upwardly through the riser 18 under sufficiently elevated temperature conditions to maintain an outlet temperature of about 900° F. at the discharge of the suspension from the riser. Riser 18 discharges into the lower portion of separator chamber 2 through suitable discharge means formed by deflector baffle 17' more fully discussed herein. In separator 2 catalytic material discharged from riser 18 settles out due to a substantial reduction in its vertical velocity component and falls on to a relatively dense fluid bed of catalytic material lying therebelow and having an upper level or meniscus 78 below the discharge of riser 18. In a similar manner hot regenerated catalytic material is withdrawn into the well defined by baffle 26 and thereafter enters riser 16 wherein it is mixed with a second hydrocarbon reactant material introduced by hollow stem valve 30 to form a suspension of hydrocarbon reactant and catalytic material. The suspension at an elevated temperature is passed upwardly through riser 18 and discharged into the intermediate portion of separator 2 at an elevated temperature of about 1000° F. Riser 16 is also provided with a deflector baffle 17" spaced above the open end of riser 16. The catalytic material discharged from riser 16 due to a substantial reduction in its vertical velocity component falls out as a dispersed phase of catalytic material and falls downwardly on to the relatively dense fluid bed of catalytic material hereinbefore discussed countercurrent to hydrocarbon material passing upwardly through the separator and discharged from riser 18. The relatively dense fluid bed of catalytic material hereinbefore discussed passes generally downwardly through the stripper containing the plurality of transverse T baffles countercurrent to stripping gas introduced thereto with the stripped hydrocarbon products and stripping gas passing upwardly through the stripping zone and the separation zone eventually to be removed from the top thereof by conduit 62. Stripped catalytic material withdrawn from the bottom of the stripping chamber is then passed to the lower portion of a dense fluid bed of catalytic material in the regeneration chamber by standpipe 12 provided with flow control plug valve 32.

Figure 2:
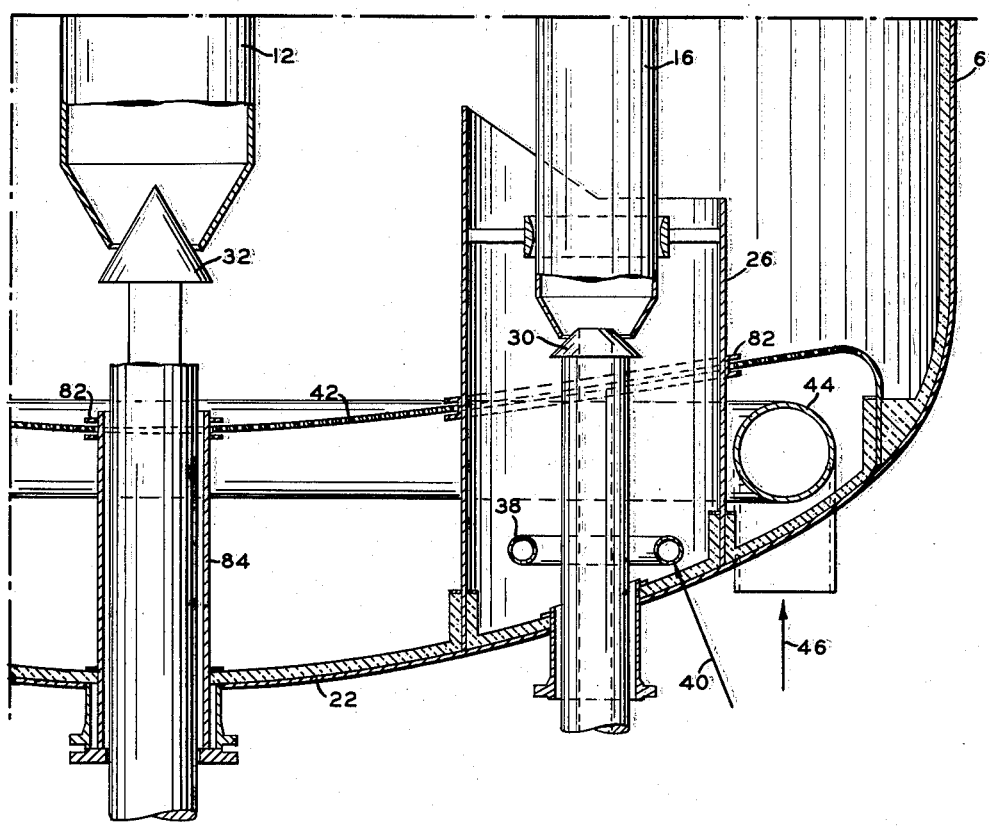

FIGURE 2 shows diagrammatically an enlarged portion of the preferred arrangement of apparatus comprising the lower portion of the regeneration chamber. The dish shaped bottom 22 of the regenrator is shown with a perforated grid member 42 thereabove. In this drawing only one riser conduit 16 is shown provided with vertically movable hollow stem plug valve 30 aligned with the bottom open end thereof for purposes of simplicity. Valve 30 of the lower portion of riser 16 is surrounded by a well defined by cylindrical baffle 26 to form an annular passageway between the lower portion of riser 16 and the cylindrical wall 26. Riser guides 80 are provided to align the bottom of the riser with the plug valve. Regeneration gas distributor manifold 44 supplied by conduit 46 is shown beneath grid 42 and defining a circle lying outside of the cylindrical baffle 26. Aerated gas manifold 38 supplied by conduit 40 is shown positioned in the lower portion of the well. As shown by FIGURE 2, the perforated baffle or grid 42 is formed to provide a downwardly extending non-perforated flange which is rigidly attached at its lower edge to the dish shaped bottom of the regenerator, rather than to the cylindrical sides of the regenrator for the reasons more fully described herein. Suitable slip joint arrangements 82 are provided where cylindrical baffles such as baffles 26 and 84 extend through the perforated baffle member 42. Cylindrical sleeve or baffle 84 is employed to shroud the valve guide of valve 32 and provide an annulus therewith through which steam is bled, thereby protecting the valve guide against excessive regenerator heat.

As a means for better understanding the apparatus and method of operation employing the apparatus the following table of data is presented by way of example.

Separator:
| Temperature | °F | 975 |
| Pressure | p.s.i.g. | 10.0 |
| vapor velocity | ft./sec. | 2.2 |
| Diameter | ft. I.D. | 37 |

Stripper:
| Temperature | °F | 964 |
| Cat. density | lb./cu. ft. | 30 |
| Diameter | ft. I.D. | 20 |
| Standpipe diameter | inches I.D. | 69 |

Regenerator:
| Temperature | °F | 1125 |
| Pressure | p.s.i.g. | 18.0 |
| Cat. density | lb./cu. ft. | 30 |
| Cat. circulation | lb./hr. | 13,020,000 |
| Diameter | ft. I.D. | 49 |

Riser 16:
| Temperature (discharge) | °F | 1000 |
| Diameter | inches | 42 |

Riser 18:
| Temperature (discharge) | °F | 900 |
| Diameter | inches | 47 |

| Fresh feed | BPSD | 47,580 |
| Hydrocarbon cycle oil | BPSD | 2,000 |
| Recycle | BPSD | 45,580 |
| Throughput | BPSD | 95,160 |

Having thus described the improved method and apparatus of this invention, as well as presented specific examples thereof, it is to be understood that many modifications may be made thereto without departing from the spirit thereof and no undue limitations are to be applied in view of the specific examples presented herein.

We claim:

1. A unitary apparatus comprising in combination a cylindrical separator chamber, a cylindrical stripper chamber of smaller diameter than said separator chamber extending downwardly therefrom and attached thereto by an inverted conical frustum forming the bottom of said separator chamber, a standpipe extending downwardly from the bottom of said cylindrical stripping chamber and attached thereto by an inverted conical frustum, said standpipe extending into the lower portion of a regenerator chamber therebelow of larger diameter than said separator chamber, at least one riser conduit extending from the lower portion of said regenerator chamber upwardly into said separator chamber externally to said stripping chamber, an annular gaseous material distributor means positioned in the upper portion of said stripping chamber and adjacent to a joint formed by said cylindrical stripper chamber and the bottom of said conical frustum forming the bottom of said separator chamber, at least one second gaseous material distributor means positioned in the lower portion of said stripper chamber formed by a plurality of horizontally spaced apart inverted V shaped baffle members which traverse said stripper chamber, a plurality of horizontally traversing and alternately staggered T shaped baffle members positioned throughout the vertical height of said stripper chamber with the uppermost plane of T shaped baffle members being above said annular gaseous material distributor means, a gaseous material distributor means in the bottom portion of said regenerator chamber, means for removing gaseous material from the upper portion of said regenerator chamber, means for passing a reactant material and finely divided solid material to said riser-reactor for flow upwardly therethrough and means for removing product material from the upper portion of said generator chamber.

2. The apparatus of claim 1 wherein the regenerator chamber is provided with a dish-shaped bottom and the gaseous material distributor means in the bottom portion of the regenerator chamber is formed by a plurality of horizontally disposed annular distributor rings positioned immediately above the dish-shaped bottom of the regenerator chamber.

3. The apparatus of claim 1 wherein the gaseous material distributor means in the bottom portion of the regenerator chamber is formed by providing the regenerator chamber with a dish-shaped bottom, positioned above and rigidly attached thereto is a perforated baffle member provided with a downwardly extending nonperforated flange to form a distributor chamber therebetween across substantially the cross-sectional area of said regenerator chamber, a perforated annular gaseous material distributor ring is positioned within and near the periphery of said distributor chamber such that gaseous material introduced to said annular distributor ring passes into said distributor chamber through said perforated baffle member and into said regenerator chamber.

References Cited by the Examiner
UNITED STATES PATENTS

| | | | |
|---|---|---|---|
| 2,449,601 | 9/48 | Gohr et al. | 208—150 |
| 2,459,824 | 1/49 | Leffer | 208—147 |
| 2,672,407 | 3/54 | Leffer | 208—147 |
| 2,727,810 | 12/55 | Leffer | 208—147 |
| 2,871,186 | 1/59 | Francisco et al. | 208—147 |
| 2,883,332 | 4/59 | Wickham | 208—78 |
| 2,893,949 | 7/59 | Prater | 208—150 |
| 2,900,324 | 8/59 | Patton et al. | 208—147 |
| 2,900,325 | 8/59 | Rice et al. | 208—147 |
| 2,984,542 | 5/61 | Kleiber | 23—288.3 |
| 3,053,643 | 9/62 | Osborne | 22—288.3 |
| 3,053,753 | 9/62 | Slyngstad et al. | 208—150 |

ALPHONSO D. SULLIVAN, *Primary Examiner.*

UNITED STATES PATENT OFFICE
CERTIFICATE OF CORRECTION

Patent No. 3,188,184

June 8, 1965

Louis F. Rice et al.

It is hereby certified that error appears in the above numbered patent requiring correction and that the said Letters Patent should read as corrected below.

Column 2, line 26, for "realtively" read -- relatively --; column 3, line 15, for "suspensoin" read -- suspension --; column 4, line 21, for "realtively" read -- relatively --; column 5, line 48, for "throug-" read -- through---; column 7, line 29, strike out "the", first occurrence; column 9, line 26, for "stagged" read -- staggered --; column 10, lines 11 and 30, for "regenrator", each occurrence, read -- regenerator --; column 11, line 34, for "generator" read -- separator --.

Signed and sealed this 28th day of December 1965.

(SEAL)
Attest:

ERNEST W. SWIDER
Attesting Officer

EDWARD J. BRENNER
Commissioner of Patents